United States Patent [19]

Nakhamkin

[11] Patent Number: 4,872,307
[45] Date of Patent: Oct. 10, 1989

[54] RETROFIT OF SIMPLE CYCLE GAS TURBINES FOR COMPRESSED AIR ENERGY STORAGE APPLICATION

[75] Inventor: Michael Nakhamkin, Mountainside, N.J.

[73] Assignee: Gibbs & Hill, Inc., New York, N.Y.

[21] Appl. No.: 49,650

[22] Filed: May 13, 1987

[51] Int. Cl.⁴ .............................................. F02C 6/16
[52] U.S. Cl. ................................. 60/39.02; 60/39.15; 60/39.33; 60/727; 290/52
[58] Field of Search ............... 60/39.02, 39.142, 39.15, 60/39.33, 727; 290/4 D, 52

[56] References Cited

U.S. PATENT DOCUMENTS

| | | | |
|---|---|---|---|
| 2,482,791 | 9/1949 | Nettel et al. | 60/39.33 |
| 3,151,250 | 9/1964 | Carlson | 60/727 |
| 4,117,343 | 9/1978 | Hoffeins | 290/52 |
| 4,523,432 | 6/1985 | Frutschi | 60/727 |
| 4,593,202 | 6/1986 | Dickinson | 290/54 |
| 4,630,436 | 12/1986 | Frutschi | 60/727 |
| 4,686,822 | 8/1987 | Frutschi | 60/727 |

FOREIGN PATENT DOCUMENTS 2642347 4/1977 Fed. Rep. of Germany ... 60/39.142
2020367 11/1979 United Kingdom .................. 60/727

OTHER PUBLICATIONS

Nakhamkin, M. et al., "Compressed Air Energy Storage: Plant Integration, Turbomachinery Development", ASME International Gas Turbine Symposium and Exhibition, Beijing, Peoples' Republic of China, 1985.

Nakhamkin, M. et al., "Compressed Air Energy Storage: (CAES): Overview, Performance and Cost Data for 25 MW to 220 MW Plants", Joint Power Generation Conference, Toronto, Canada, 1984.

*Primary Examiner*—Donald E. Stout
*Attorney, Agent, or Firm*—Pennie & Edmonds

[57] ABSTRACT

A system is disclosed for retrofitting a plurality of gas turbines for use in compression and expansion stages of a power plant. A first gas turbine is modified to perform as a motor driven air compressor compressing air and storing such compressed air in an air storage device. A second gas turbine is modified to perform as a generator driving expander in which air previously compressed is expanded in a turbine thus generating power.

22 Claims, 1 Drawing Sheet

RETROFIT OF SIMPLE CYCLE GAS TURBINES FOR COMPRESSED AIR ENERGY STORAGE APPLICATION

CROSS-REFERENCE TO RELATED APPLICATIONS

Related U.S. patent applications are "Compressed Air Energy Storage Turbomachinery Cycle with Compression Heat Recovery Storage, Steam Generation and Utilization During Power Generation" (U.S. Pat. No. 4,765,142), "Compressed Air Turbomachinery Cycle with Reheat and High Pressure Air Preheating in Recuperator" (Ser. No. 049,870), "Utilization of Circulating Fluidized Bed Combustors for Compressed Air Energy Storage Application" (Ser. No. 049,649) and "Advanced Recuperator" (Ser. No. 048,849), all of which are filed concurrently and are incorporated herein by reference.

BACKGROUND OF THE INVENTION

This invention relates generally to the storage and subsequent recovery of compressed air energy and more specifically to the retrofit of simple cycle gas turbine engines for compressed air energy storage application.

It will be appreciated that there exists a significant daily variation in the total amount of power required from a baseload power plant. However, it would be most costly and wasteful to provide for the peak demands of short duration with the same expensive, although efficient, baseload power plant machinery which is justified for baseload power generation.

In the past, power utilities have addressed the problem of providing additional non-baseload peaking power in an overall economical manner through the use of simple cycle gas turbines (SCGTs). Simple cycle gas turbines (SCGTs) are state-of-the-art turbomachinery designed for peaking duty operation. Their main elements are an air compressor, a turbine and a combustor. To meet consumer demand, SCGTs are coupled to electric generators to provide additional power to baseload power plants during peak loads.

Most recently, power utilities have addressed the aforementioned problem of supplying peaking power in an overall cost effective manner through the use of Compressed Air Energy Storage (CAES) systems. CAES plants store off-peak energy from relatively inexpensive energy sources such as coal and nuclear baseload plants by compressing air into storage devices such as underground caverns or reservoirs. Underground storage can be developed in hard rock, bedded salt, salt dome or aquifer media.

Following off-peak storage, the air is withdrawn from storage, heated, combined with fuel and expanded through expanders, i.e., turbines, to provide needed peaking or intermediate power. Since inexpensive off-peak energy is used to compress the air, the need for premium fuels, such as natural gas and imported oil, is reduced by as much as about two-thirds compared with conventional gas turbines. In such circumstances, utilization of non-peak energy for the subsequent production of peak energy is clearly desirable, especially since non-peak energy can often be obtained for far less than the cost of obtaining peak energy.

Compressors and turbines in CAES plants are each connected to a synchronous electrical machine such as a generator/motor device through respective clutches, permitting operation either solely of the compressors or solely of the turbines during appropriate selected time periods. During off-peak periods (i.e., nights and weekends), the compressor train is driven through its clutch by the generator/motor. In this scheme, the generator/motor functions as a motor, drawing power from a power grid. The compressed air is then cooled and delivered to underground storage.

During peak/intermediate periods, with the turbine clutch engaged, air is withdrawn from storage and provided to a combustor. The combustor combines the pre-heated compressed air with a fuel, such as No. 2 fuel oil, and expands the mixture of fuel and compressed air in a turbine, which provides power by driving the generator/motor. In this scheme, the generator/motor functions as a generator, providing power to a power grid. To improve the CAES heat rate, waste heat from a low pressure turbine exhaust is used to pre-heat high pressure turbine inlet air in a recuperator.

For a more complete discussion of CAES systems, see Nakhamkin, M. et al. "Compressed Air Energy Storage: Plant Integration, Turbomachinery Development", ASME International Gas Turbine Symposium and Exhibition, Beijing, Peoples' Republic of China, 1985 and Nakhamkin, M. et al. "Compressed Air Energy Storage (CAES): Overview, Performance and Cost Data for 25 MW to 220 MW Plants", Joint Power Generation Conference, Toronto, Canada 1984, both incorporated herein by reference.

Unfortunately, SCGTs require the use of significantly more fuel than CAES systems in order to provide a like quantity of peaking power. Additional considerations such as that of fuel quality required for proper operation and efficient use of previously stored energy also tend to favor CAES systems. However, numerous SCGT peaking power plants are presently in existence and do provide a means for supplying peaking power, albeit at considerable expense.

Due to the considerable expense in constructing new CAES plants it is most desirable to convert existing simple cycle gas turbine plants to CAES plants. Unfortunately, direct use of SCGTs in the compression and expansion trains of CAES systems such as those described in the cross-referenced applications presents difficulty due to SCGT maximum cycle pressures which are generally too low for typical underground storage depths and corresponding compressed air storage pressures required in typical CAES air storage and operation. An additional difficulty encountered in direct use of SCGTs in CAES systems relates to pressure losses generally occurring in underground air storage devices.

SUMMARY OF THE INVENTION

The present invention comprises a retrofit of existing simple cycle gas turbine engines (SCGTs) to provide peaking energy for CAES application.

In the presently preferred embodiment, a first conventional gas turbine engines is modified to provide a compression train while a second gas turbine engines is modified to provide an expansion train. The compressor of the first gas turbine is powered by a motor and compresses air to an initially desired pressure. Advantageously, the original generator can be the original generator that was driven by the gas turbine, but now configured so as to operate as a motor. The compressed air is subsequently input to an additional compressor which is also motor driven and compresses the air to a greater pressure adequate for storage in a storage device and eventual use in the expansion train of the CAES system. In accordance with the invention, to minimize power consumption in driving the first turbine, a turbine element of the first gas turbine is debladed for use in the power-consuming compression stage. Since the motor is driven by electricity generated in the off-peak period, fuel such as that previously combusted and expanded in the turbine element of the gas turbine during production of peaking power is not used in the energy consuming compression train of the CAES system.

Similarly, a compressor of the second gas turbine is debladed for use in the power-producing expansion stage; and the second gas turbine, which was designed to receive compressed air from a compressor, is instead connected in the CAES system so that it now receives compressed air from the storage device by way of a recuperator and combustor.

Further, an electrical generator previously associated with the second gas turbine is replaced by one of approximately double capacity, because the turbine generates approximately twice its original capacity when the compressor is debladed.

Accordingly, it is a primary object of the present invention to provide a new and improved energy storage system.

Another object of the present invention is to reduce the cost of providing peaking power.

A further object of the present invention is to provide for retrofitting existing gas turbines for CAES application.

A still further object of the present invention is to modify a plurality of existing gas turbines for CAES application in a most cost effective manner.

An additional object of the present invention is to provide for cost effective retrofitting of a plurality of gas turbines for use in compression and expansion trains of a CAES system.

BRIEF DESCRIPTION OF THE DRAWINGS

These and other objects, features and advantages of the invention will become more readily apparent with references to the following description of the invention in which.

DETAILED DESCRIPTION OF THE INVENTION

Figure 1:
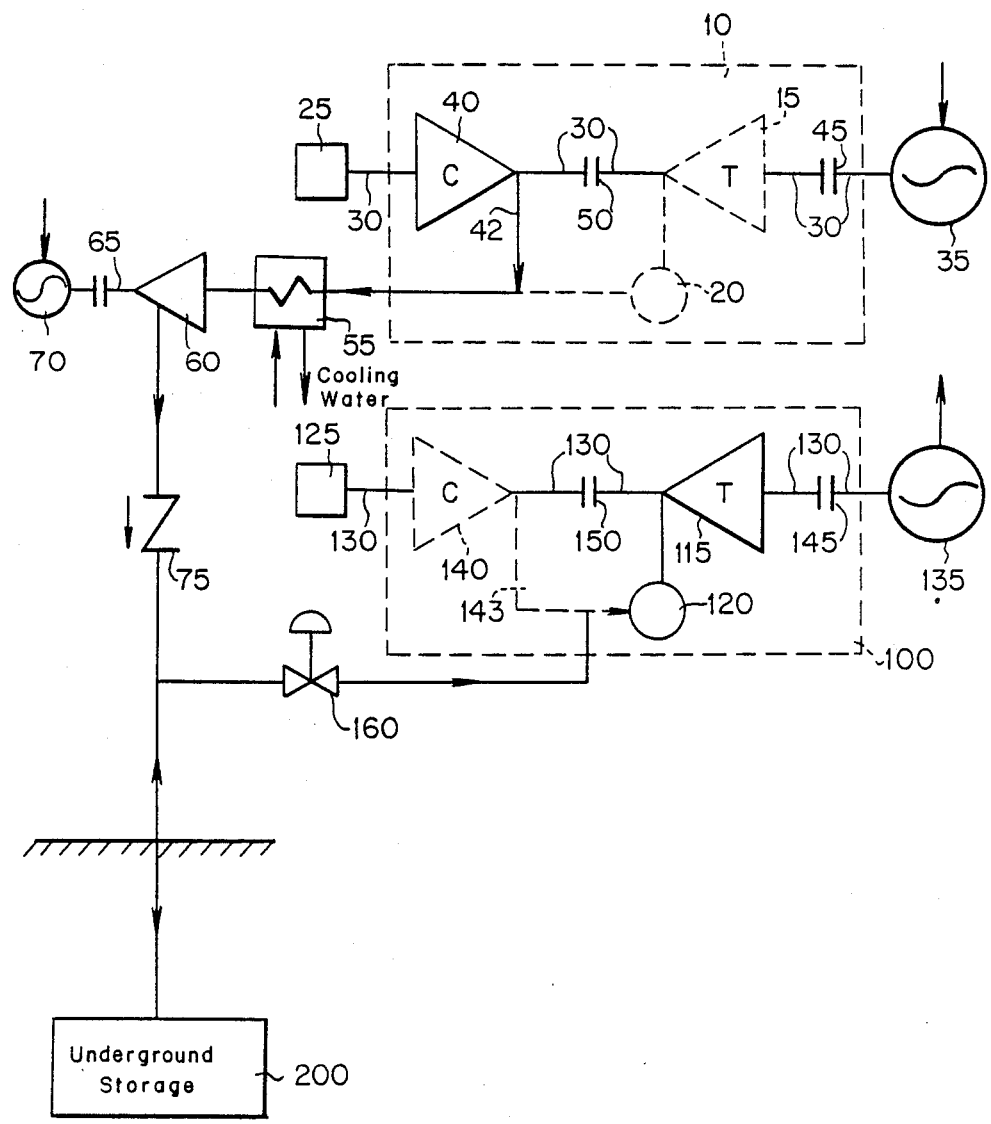
FIG. 1 is a schematic diagram of a retrofit of simple cycle gas turbines for CAES application.

Referring to FIG. 1, there is shown a preferred embodiment of the present invention in which two gas turbine engines 10, 100 are modified and additional equipment incorporated to provide a CAES systems.

A gas turbine engines, in basic form, comprises an air compressor, a turbine portion and a combustor. Although the turbine portion is only a single element of the entire assembly, the entire assembly is commonly referred to as a gas turbine, or gas turbine engines. In operation of a simple single shaft gas turbine, air is compressed in a compressor after which it enters a combustion chamber where the temperature is increased through the combustion of fuel while the pressure remains essentially constant. The resulting high temperature air is then exhausted through the turbine portion where it performs work, typically by causing turbine blades to rotate. Typically, such turbines are used to drive electric power generators which convert the rotational energy of the turbine portion to electricity.

In accordance with the present invention, the two gas turbines of FIG. 1 are individually modified as follows. The first gas turbine 10 is modified for use as a motor driven compressor, thus forming a portion of the compression train of the preferred embodiment, while the second gas turbine is modified for use as a turboexpander, thus forming a portion of the expansion train of the preferred embodiment.

Gas turbine 10 comprises a turbine element 15 and a compressor 40 connected to a shaft 30. Clutch devices 45, 50 are provided in gas turbine 10 for isolating compressor 40, turbine element 15 and a motor 35. Advantageously, motor 35 can be the original generator that was driven by the gas turbine, but now configured so as to operate as a motor.

In accordance with the invention, the turbine element 15 of the first gas turbine is initially debladed since such turbine element is not to be utilized for the production of energy. Consequently, no fuel will be supplied to combustor 20 during this energy absorbing compression stage. In order to compensate for the axial loss of thrust balance due to deblading turbine element 15, an externally located additional thrust bearing 25 is installed on shaft 30. Shaft 30 serves to transmit rotational energy from a synchronous electrical machine, illustratively motor 35 to turbine element 15, compressor 40 and thrust bearing 25.

A compressor discharge flange (not shown) is provided in the compressor of a conventional gas turbine to direct compressed air to combustor 20. However, in the present invention such compressed air input to combustor 20 is removed and the compressed air is directed to an intercooler 55 via line 42.

In addition to the above modification to gas turbine 10, intercooler 55, a motor driven high pressure compressor 60 and an aftercooler 75 are provided to complete the compression train.

Intercooler 55 is provided to cool the compressed air entering high pressure compressor 60, thereby reducing the work of high pressure compression and avoiding the use of costly high temperature materials for the compressor hardware.

High pressure compressor 60 further compresses the air from compressor 40 which functions as a lower pressure compressor. Compressed air pressures necessary for proper air storage and system operation are highly dependent on the type and depth of the air storage device. Illustratively, a pressure range of approximately 400 psi to 1500 psi has been found adequate for a salt dome or aquifer located at a depth of approximately 1500 feet. High pressure compressor 60 is preferably driven through clutch 65 by motor 70. Alternatively, high pressure compressor 60 may be driven by motor 35.

Aftercooler 75 is provided to cool the compressed air exiting high pressure compressor 60 before entering the air storage device 200. Although compressed air storage at higher temperatures may improve the thermal efficiency of the system, higher temperatures may introduce undesirable effects in the storage device, such as geological structural problems associated with an underground air storage device.

Gas turbine 100 comprises a turbine element 115 and a compressor 140 connected to a shaft 130. Clutch devices 145, 150 are provided in gas turbine 100 for isolating compressor 140, turbine element 115 and a gas turbine generator 135. In accordance with the invention, compressor 140 is initially debladed since such compressor is not to be utilized for the compression of air. In order to compensate for the axial loss of thrust balance due to deblading compressor 140, externally located additional thrust bearing 125 is installed on shaft 130. Shaft 130 serves to transmit rotational energy from turbine 115 to a synchronous electrical machine, illustratively generator 135, compressor 140, and thrust bearing 125.

In addition to the above modifications to gas turbine 100, the compressed air output of compressor 140 which heretofore was input to combustor 120 via line 143 is eliminated as a functional device. Further, a valve 160 and associated piping are placed between combustor 120 and air storage device 200. Valve 160 and air storage device 200 serve as a compressed air source for combustor 120, in place of compressor 140. Advantageously, compressed air from air storage device 200 is pretreated in a recuperator (not shown) before the air is provided to combustor 120. Exhaust gas from turbine 100 is supplied to the recuperator as its source of heat.

The conventional gas turbine is ordinarily coupled to an electrical power generator of predetermined capacity. Further in accordance with the invention, the electrical generator of the conventional gas turbine is removed and replaced by an electrical generator 135 of approximately double capacity since turbine 100 has approximately twice its original output once the compressor is debladed. As a result, the CAES system with a single generator outputs approximately the same power as the combined efforts of the two gas turbines each having its own generator, from which it was constructed.

As will be apparent to one skilled in the art, compressed air piping, supports, valves and the like are provided to integrate the first and second modified gas turbines to result in a CAES power plant. In particular, the present invention may be used to provide the compressors and turbines disclosed in the CAES systems of the cross-referenced applications.

While the teachings of the present invention may be practiced in other fields, the invention will be described in an application relating to the retrofit of two gas turbines in accordance with the above discussed modifications and additions.

More specifically, the present invention operates primarily in two modes: the compression mode and the expansion, or power generation mode. During the compression mode, ambient air is drawn into compressor 40 which is powered by motor 35. The compressor compresses air, thereby decreasing its volume and increasing its pressure. As a result, the compressed air exiting compressor 40 is provided with an elevated temperature, illustratively up to 700° F. This heated compressed air exits compressor 40 via line 42 and is cooled by an intercooler 55 in order to reduce the compressed air temperature to the desired level before entering a higher pressure compressor 60. This high pressure compressor 60 further compresses the air to the desired level, while aftercooler 75 further cools the compressed air prior to entering the air storage device 200.

During the expansion (power generation) mode, compressed air from the air storage device is routed through valve 160 to combustor 120 associated with turbine 115. The high pressure combustor combines the compressed air with a fuel and combusts the result to produce a hot gas that drives turbine 115 connected to generator 135, thus producing electrical power.

Since parameters such as temperature and pressure associated with compressors, turbines, combustors and cooling devices depend largely on the characteristics of the specific system in use, the parameters set forth herein are not absolute, but rather are illustrative and meant to provide the reader with an appreciation of the interaction among and relative proportions of such parameters.

Thus it can be seen that there is provided a power system whereby a plurality of conventional gas turbines are modified and additional equipment installed to result in a CAES system.

In addition, it is to be understood that the invention can be carried out by different equipment and devices and that various modifications, both as to equipment details and operating procedures can be effected without departing from the spirit and scope of the claimed invention. More specifically, the present invention includes, but is not limited to, schemes in which any number of gas turbines are modified to compress and/or expand air. Furthermore, fluidized bed combustors, steam generation and utilization during power generation, recuperators and reheat with high pressure air preheating, which are detailed in the documents incorporated herein by reference may be advantageously applied to the present invention.

What is claimed is:

1. In a gas turbine power plant of the type in which first and second gas turbine engines are each used to produce power, each of said engines comprising an air compressor, a turbine element and a combustor, the improvement comprising the steps of:

deblading said turbine element of said first gas turbine engine;

coupling an additional compressor to said first gas turbine engine, said additional compressor having a compressed air input connected to a compressed air output of said compressor of said first gas turbine engine and a compressed air output connected to an air storage device;

coupling to said additional compressor and said compressor of said first gas turbine engine means for driving them;

deblading said compressor of said second gas turbine engine; and providing compressed air from said air storage device to said turbine element of said second gas turbine engine instead of said compressor of said second gas turbine engine.

2. The method of claim 1 wherein said step of coupling comprises the steps of:

coupling a first electrical driving machine to a shaft of said first gas turbine engine, to which said turbine element and said compressor of said first gas turbine engine may be coupled; and coupling a second electrical driving machine to a shaft of said additional compressor.

3. The method of claim 1 further comprising the steps of:

coupling a first thrust bearing to said shaft of said first gas turbine engine to compensate for said deblading of said turbine element of said first gas turbine engine; and coupling a second thrust bearing to said shaft of said second gas turbine engine to compensate for said deblading of said compressor of said second gas turbine engine.

4. The method of claim 1 further comprising the steps of:
inserting an intercooler between said compressed air output of said compressor of said first gas turbine engine and said compressed air input of said additional compressor; and
inserting an aftercooler between a compressed air output of said additional compressor and an air storage device.

5. The method of claim 2 further comprising the step of coupling an electrical generating machine to a shaft of said second gas turbine engine, to which said turbine element and said compressor of said second gas turbine engine may be coupled.

6. The method of claim 1 further comprising the step of:
coupling an electrical generating machine to a shaft of said second gas turbine engine, to which shaft said turbine element and said compressor of said second gas turbine engine may be coupled.

7. The method of claim 1 wherein the step of coupling said driving means comprises coupling an electrical driving machine to a shaft of said first gas turbine engine, to which shaft said turbine element, said compressor of said first gas turbine engine and said additional compressor may all be coupled.

8. A method for modifying a plurality of gas turbine engines for use in a Compressed Air Energy Storage (CAES) system comprising the steps of:
deblading a turbine element of a first gas turbine engine;
providing compressed air from a compressed air output of a compressor of said first gas turbine engine to an air storage device instead of to said turbine element of said first gas turbine engine;
deblading a compressor of a second gas turbine engine;
providing compressed air from said air storage device to a turbine element of said second gas turbine engine in place of air from said compressor of said second gas turbine engine; and
coupling driving means to said first gas turbine engine.

9. The method of claim 8 wherein said step of coupling comprises the step of:
coupling an electrical driving machine to a shaft of said first gas turbine engine, to which said turbine element and said compressor of said first gas turbine engine may be coupled; and
said method further comprises the step of:
coupling an electrical generating machine to a shaft of said second gas turbine engine, to which said turbine element and said compressor of said second gas turbine engine may be coupled.

10. The method of claim 9 further comprising the steps of:
coupling a first thrust bearing to said shaft of said first gas turbine engine to compensate for said deblading of said first turbine element; and
coupling a second thrust bearing to said shaft of said second gas turbine engine to compensate for said deblading of said second compressor.

11. The method of claim 8 further comprising the step of:
inserting an aftercooler between said compressed air output of said compressor of said first gas turbine engine and said air storage device.

12. The method of claim 8 further comprising the steps of:
coupling an additional compressor to said compressed air output of said compressor of said first gas turbine engine to further compress air compressed by said compressor of said first gas turbine engine, said additional compressor having a compressed air output coupled to said air storage device; and
providing driving means for driving said additional compressor.

13. A Compressed Air Energy Storage (CAES) system comprising:
a first gas turbine engine having a shaft coupled to electrical driving means, a compressor and a debladed turbine element;
a second gas turbine engine having a shaft coupled to electrical generating means, a turbine element and a debladed compressor;
a first interconnection from a compressed air output of said compressor of said first gas turbine engine to an air storage device; and
a second interconnection from said air storage device to said turbine element of said second gas turbine engine.

14. The CAES system of claim 13 further comprising a combustor connected to said second interconnection between said air storage device and said turbine element of said second gas turbine engine, said combustor being used for the combustion of a mixture of a fuel and compressed air.

15. The CAES system of claim 13 further comprising an additional compressor connected to said first interconnection between said compressor of said first gas turbine engine and said air storage device.

16. The CAES system of claim 15 further comprising an intercooler connected to said first interconnection between said compressor of said first gas turbine engine and said additional compressor.

17. The CAES system of claim 15 further comprising an aftercooler connected to said first interconnection between said additional compressor and said air storage device.

18. The CAES system of claim 13 further comprising:
a first thrust bearing coupled to said shaft of said first gas turbine engine to compensate for thrust associated with said debladed turbine element; and
a second thrust bearing coupled to said shaft of said second gas turbine engine to compensate for thrust associated with said debladed compressor.

19. The CAES system of claim 13 wherein said electrical driving means is a motor.

20. The CAES system of claim 13 wherein said electrical generating means is a generator.

21. The CAES system of claim 15 wherein said additional compressor is driven by said electrical driving means.

22. The CAES system of claim 15 wherein said additional compressor is driven by a further electrical driving machine.

* * * * *